United States Patent
Elgan

(10) Patent No.: US 9,386,832 B2
(45) Date of Patent: Jul. 12, 2016

(54) PROTECTIVE HANDHELD ELECTRONICS CASE WITH INTEGRATED EXTENSION DEVICE

(71) Applicant: Steven L. Elgan, American Fork, UT (US)

(72) Inventor: Steven L. Elgan, American Fork, UT (US)

(73) Assignee: Extendapic LLC, American Falls, ID (US)

( * ) Notice: Subject to any disclaimer, the term of this patent is extended or adjusted under 35 U.S.C. 154(b) by 0 days.

(21) Appl. No.: 14/514,751

(22) Filed: Oct. 15, 2014

(65) Prior Publication Data

US 2015/0102074 A1    Apr. 16, 2015

Related U.S. Application Data

(60) Provisional application No. 61/891,664, filed on Oct. 16, 2013.

(51) Int. Cl.
*G03B 17/00* (2006.01)
*A45C 11/00* (2006.01)

(52) U.S. Cl.
CPC ........... *A45C 11/00* (2013.01); *A45C 2011/002* (2013.01)

(58) Field of Classification Search
USPC .......................... 396/425; D14/250, 251, 252
See application file for complete search history.

(56) References Cited

U.S. PATENT DOCUMENTS

| | | | | |
|---|---|---|---|---|
| 4,530,580 A * | 7/1985 | Ueda | ...................... | F16M 13/04 248/187.1 |
| 5,768,645 A * | 6/1998 | Kessler | .................. | G03B 17/38 396/376 |
| 7,684,694 B2 * | 3/2010 | Fromm | .................. | F16M 11/14 396/376 |
| 7,706,673 B1 * | 4/2010 | Staudinger | ............. | F16M 11/06 348/211.2 |
| D654,483 S * | 2/2012 | Richardson | ................... | D14/250 |
| D706,254 S * | 6/2014 | Chang | .......................... | D14/217 |
| D740,797 S * | 10/2015 | Daniel | ........................ | D14/250 |
| 9,170,473 B1 * | 10/2015 | Li | ......................... | G03B 17/561 |
| 2003/0083023 A1 * | 5/2003 | Chang | ................... | H01Q 1/244 455/90.1 |
| 2008/0062051 A1 * | 3/2008 | Park | ...................... | H01Q 1/244 343/702 |
| 2011/0279346 A1 * | 11/2011 | Kouno | ................... | H01Q 1/084 343/882 |
| 2013/0176412 A1 * | 7/2013 | Chen | ...................... | H04N 7/183 348/77 |
| 2014/0087722 A1 * | 3/2014 | Brittain | ................. | H04W 88/06 455/426.1 |

OTHER PUBLICATIONS

Snapstyk iPhone Case; http://mikeshouts.com/snapstyk-selfie-stick-smartphone-case/; Oct. 28, 2015.*

(Continued)

*Primary Examiner* — Rodney Fuller

(57) ABSTRACT

A protective handheld electronics case with integrated extension device, which may safely and securely extend an encased personal electronics device via a telescoping rod assembly. The telescoping rod assembly extends the personal electronics device beyond arms reach and locks the device at a specific recording angle set by the user. This function is specifically helpful when the camera is oriented on the user for self portraits. This function allows the user to ability to take self portraits or video without the undesirable need to fully extend the user's arms. Therefore, in general, a user is enabled to take self portraits with a greater field of view.

2 Claims, 8 Drawing Sheets

(56) References Cited

OTHER PUBLICATIONS

Popsicase; http://mikeshouts.com/meet-popsicase-the-first-iphone-case-with-an-integrated-selfie-stick/; 10/28/25.*
Stick&Case; http://www.i4u.com/2015/06/92274/smartphone-case-integrated-selfie-stick; Oct. 28, 2015.*
Selfie Steady Stick; http://www.shapeways.com/product/VM7RCXASS/iphone-6-case-with-quot-selfie-steady-stick-quot; Oct. 28, 2015.*
TidyTilt for iPhone (https://www.kickstarter.com/projects/1498649420/tidytilt-for-iphone) Oct. 17, 2014; 6 pages.
TidyTilt Case for iPhone 5 or iPhone 5s (https://support.logitech.com/product/10928/en_us/home) Oct. 17, 2014; 1 page.

* cited by examiner

PROTECTIVE HANDHELD ELECTRONICS CASE WITH INTEGRATED EXTENSION DEVICE

CROSS-REFERENCE TO RELATED APPLICATIONS

This application claims priority to U.S. Provisional Patent Application, Ser. No. 61/891,664, filed on Oct. 16, 2013, and entitled PROTECTIVE HANDHELD ELECTRONICS CASE WITH INTEGRATED EXTENSION DEVICE, the entire disclosure of which is hereby incorporated by reference in its entirety.

BACKGROUND OF THE INVENTION

1. Field of the Invention

Some embodiments of the invention relate to the field of handheld electronics protection.

2. Description of the Related Art

There are many known handheld electronics protective cases. Most are made from polymers, silicone gels, or other similar materials that absorb impact when the device is dropped thereby protecting the device. Some are hybrid models that combine multiple materials both soft and hard as well as creative geometry to create additional protection.

Some cases provide additional function beyond traditional protection. For instance, adding a loop to hold a stylus or adding a magnetic cover that serves both as a stand and headphone holder as found in Logitech's TidyTilt® Case.

BRIEF SUMMARY OF THE PRESENT INVENTION

Some embodiments of the present invention add function to this protection by enhancing the capability of electronic devices that capture photos and video. For example so embodiments allow for the extension of both the case and the encased electronic device so as to increase the electronic device's camera field of view, ultimately enabling the user to take personal photos without the needing to fully extend their arm. Additionally, it may in some embodiments offer the user a greater field of view when taking self-directed portraits and the ability to capture photos and video from unique perspectives beyond the normal reach of the user's arms. Some embodiments comprise a protective case with a self-contained telescoping rod. The telescoping rod is strong enough that when fully extended, it will support the full weight of the electronic device and case. This allows the user to also extend the device beyond arm's length. When fully extended, the user can hold onto the encased device via the end of the telescoping rod thereby enabling the user to significantly increase the device's built in photo and/or video recording field of view when taking self photos and videos. In addition to enhancing the user's ability to take self portraits and videos, the extension permits unique photo and video perspectives achievable beyond the length of one's arms. For example taking a bird's eye photo of a crowd as the device is extended vertically beyond the user's extended arm. Some embodiments also provide the extension feature in addition to protective abilities, by protecting the device.

REFERENCE NUMERALS IN THE DRAWINGS

| | | | |
|---|---|---|---|
| 1 | device function cavities | 2 | camera lens cavity |
| 3 | upper housing | 4 | lower housing |
| 5 | telescoping rod | 6 | geared rod base |
| 7 | housing gear teeth | 8 | pivot joint |
| 9 | rod channel | 11 | stowed telescoping rod |
| 12 | housing latch | 13 | rod tip |
| 14 | telescoping rod assembly | 15 | extended rod assembly |
| 16 | single housing main body | 17 | telescoping rod handle |
| 18 | rod tip v2 | 19 | alignment channels |
| 20 | rod cap | | |

DETAILED DESCRIPTION

Figure 2:
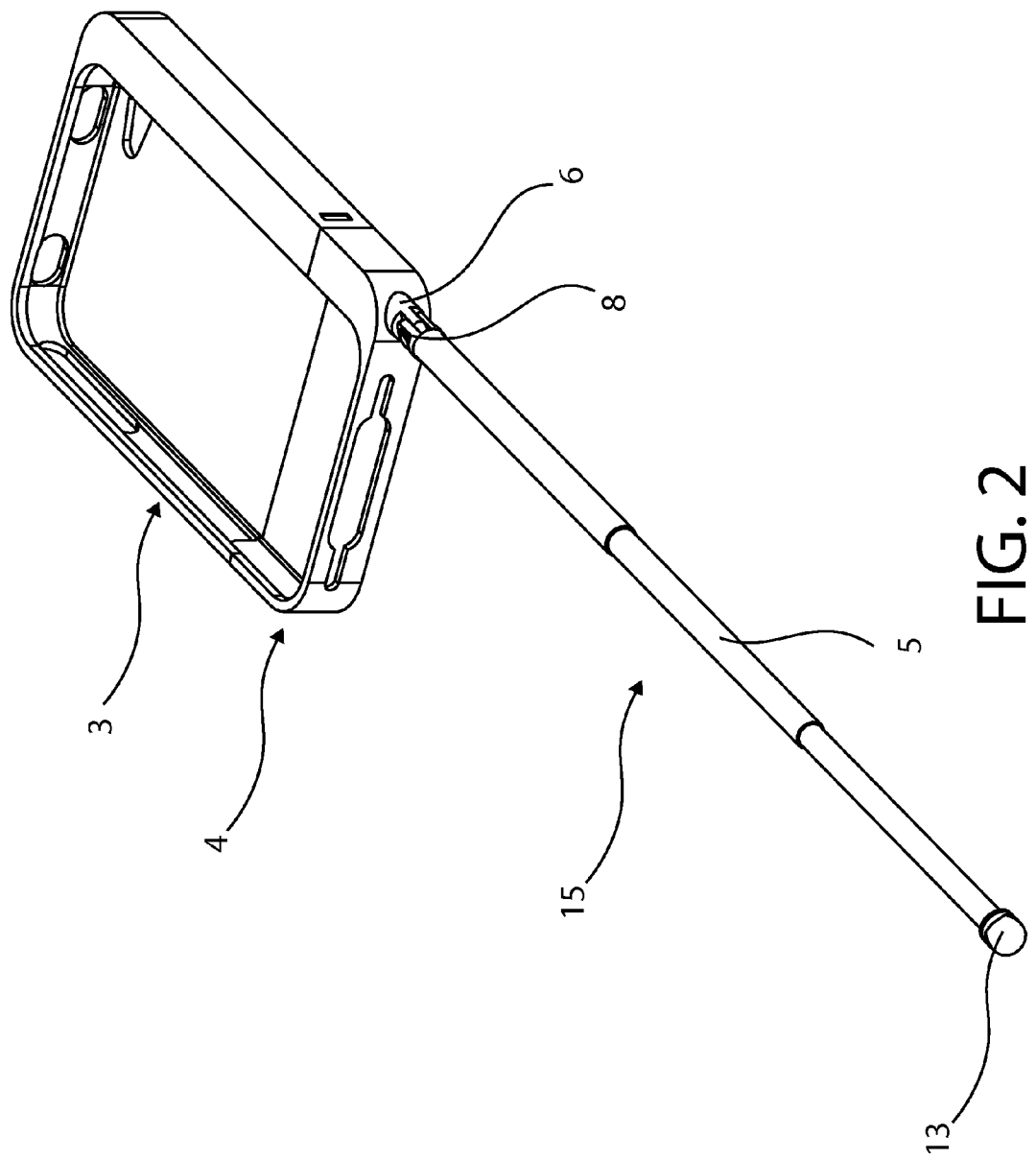
FIG. 2 is a perspective view, showing the case with extended telescoping rod.
Figure 3:
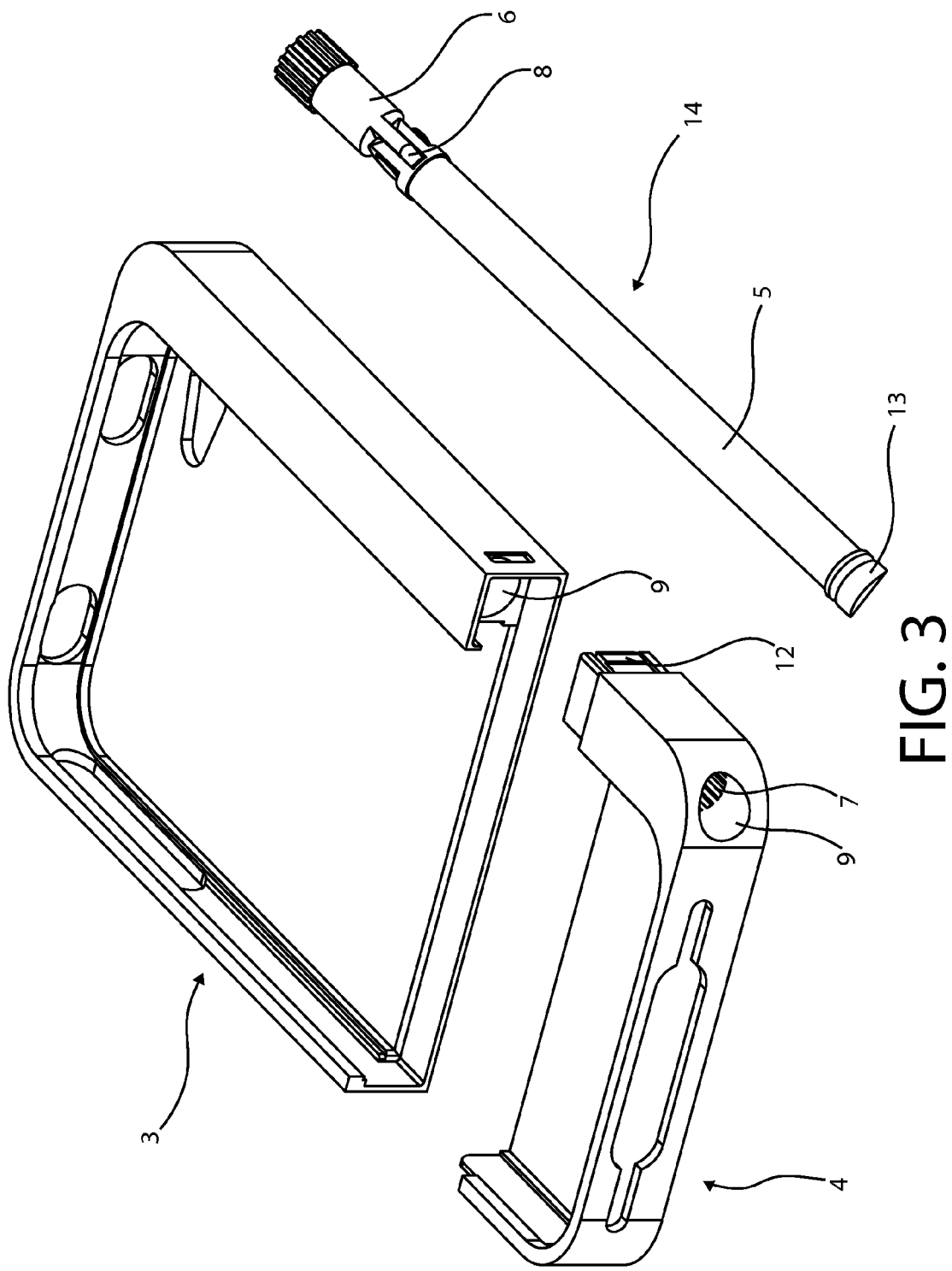
FIG. 3 is a disassembled view, showing some main components of the case.
Figure 4:
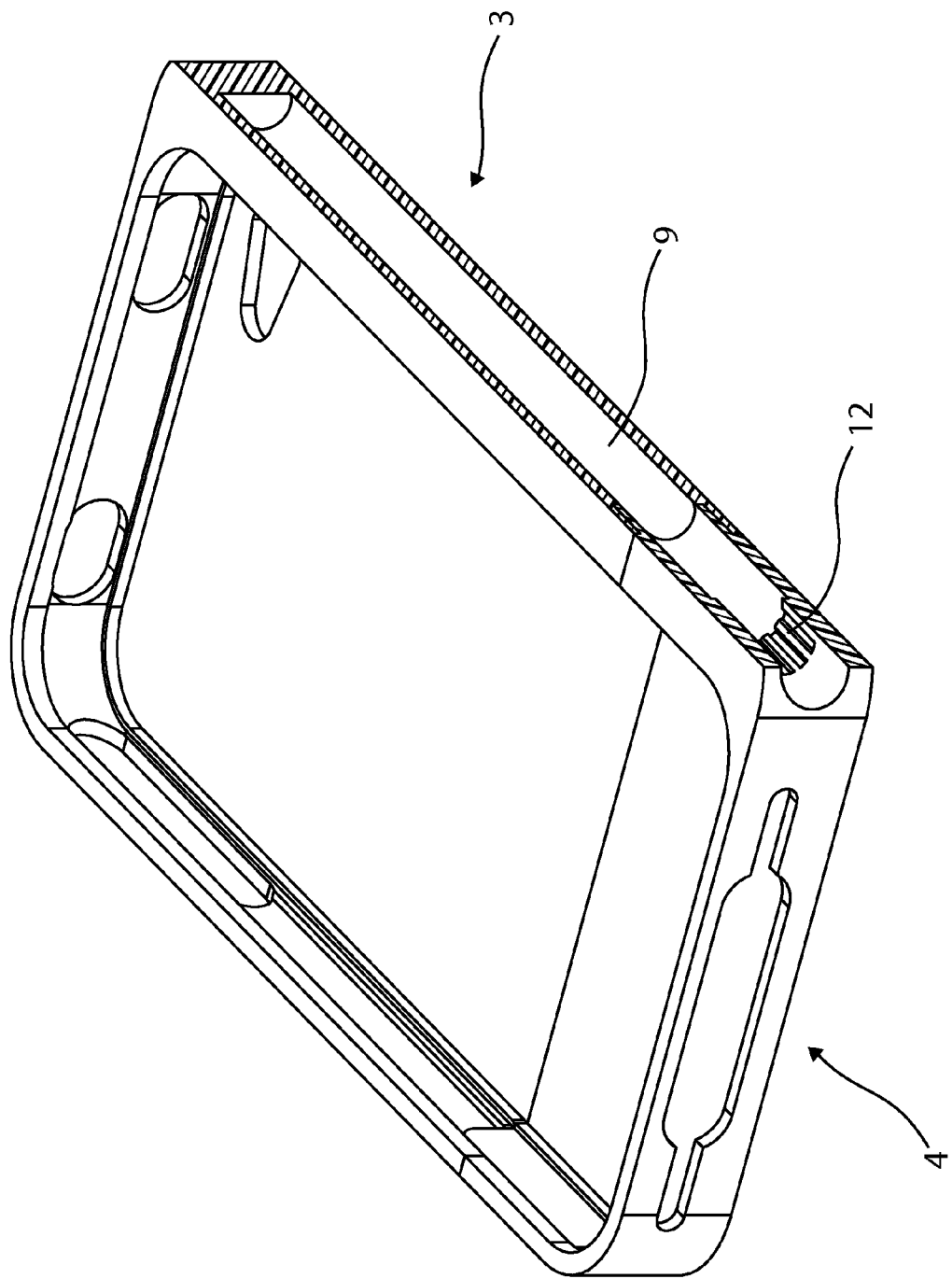
FIG. 4 is a cut-away view of housing's cylindrical rod cavity.
Figure 5:
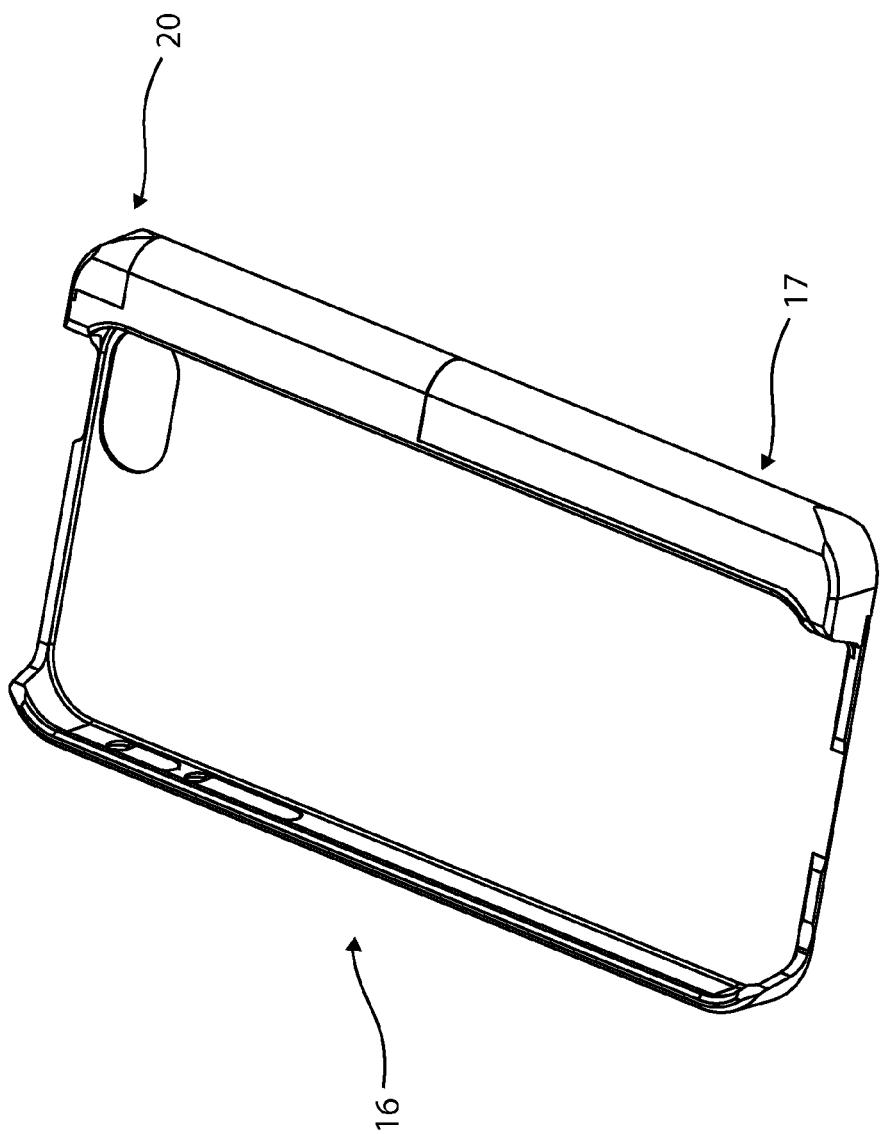
FIG. 5 is a perspective view of the single housing center balanced alternative embodiment fully closed.

The protective case is made up of three main components, the upper housing 3, the lower housing 4, the telescoping rod assembly as shown in FIG. 3. The telescoping rod is connected to the geared rod base via a pin and cotter at its pivot joint 8 as shown in FIG. 2. The rod base 6 consists of a short cylinder with geared teeth as shown in FIG. 2. The upper housing 3 and lower housing 4 are designed to form fit the electronic device. When combined and secured via the housing latch 12, the combined case possesses all cavities 1 and 2 necessary to allow the free use of electronic device buttons, cameras, and external sensors while still fully encompassing the device in a protective layer of impact absorbing material. The electronic device slides into the form-fitting upper housing 3 as shown in FIG. 3. Also in FIG. 3, the telescoping assembly 14 comprising the telescoping rods 5, the geared base 6, and the tip 13 is then placed base first into a cylindrical channel 9 bored into the side of the upper housing 3 shown in FIG. 3 and cross-section in FIG. 4. To prevent the cylindrical tubes of the telescoping rods from slipping axially against each other when extended, the tubes are compressed slightly to form an oval cross section. Lastly, the lower housing 4 aligns and connects to the upper housing 3 via and the housing latch 12.

Figure 1:
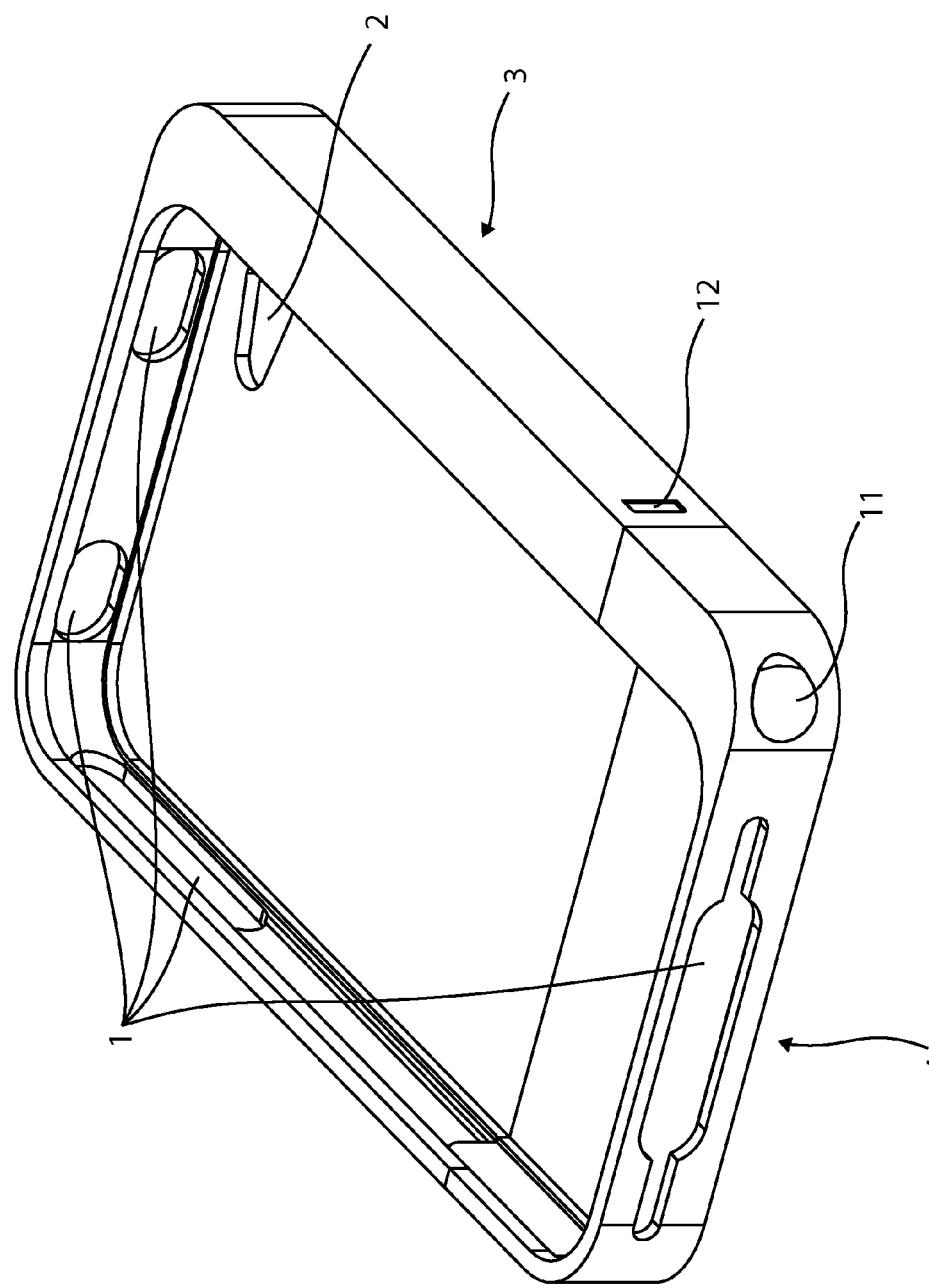
FIG. 1 is a perspective view, showing an embodiment of a case with retracted telescoping rod.
Figure 6:
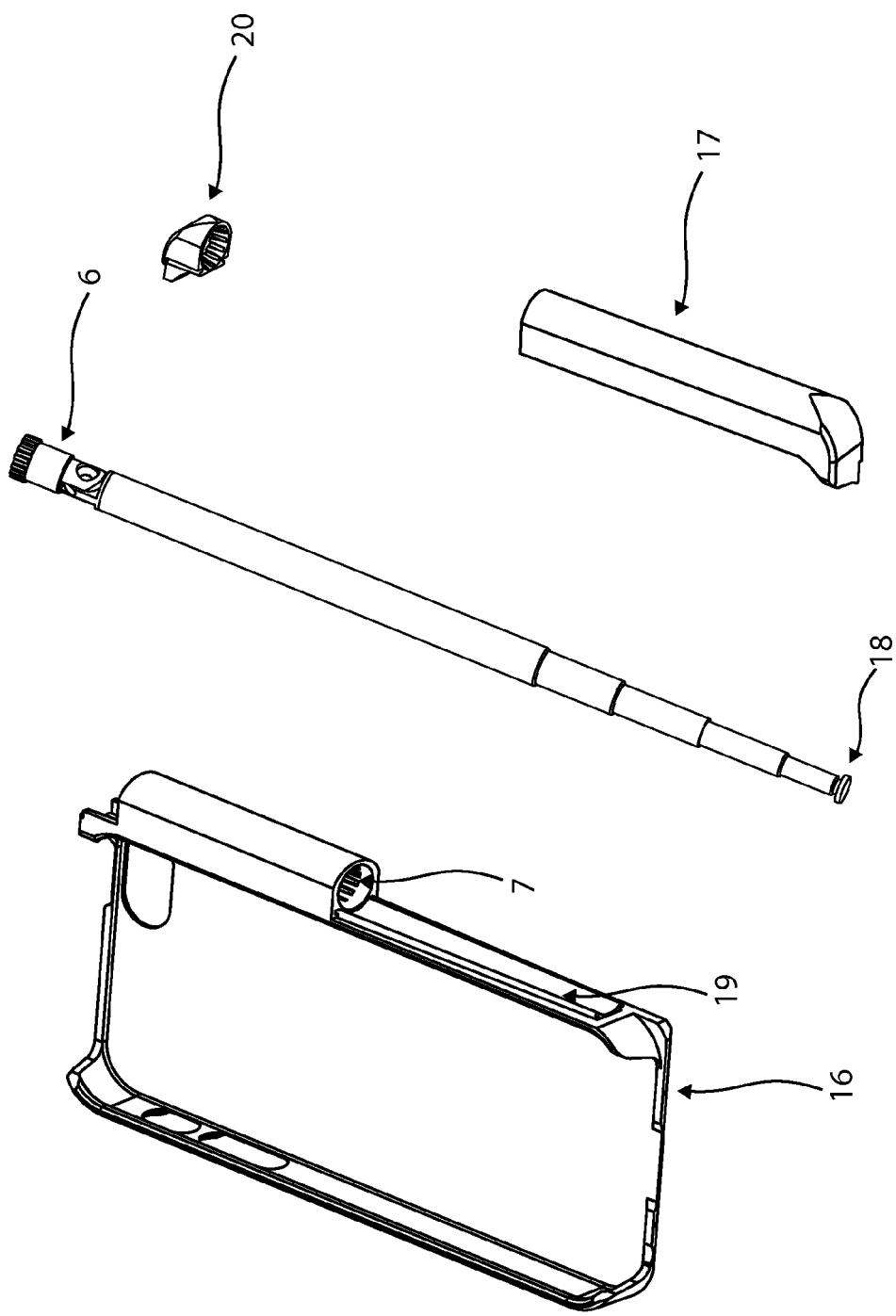
FIG. 6 is a disassembled view of the single housing center balanced embodiment.
Figure 7:
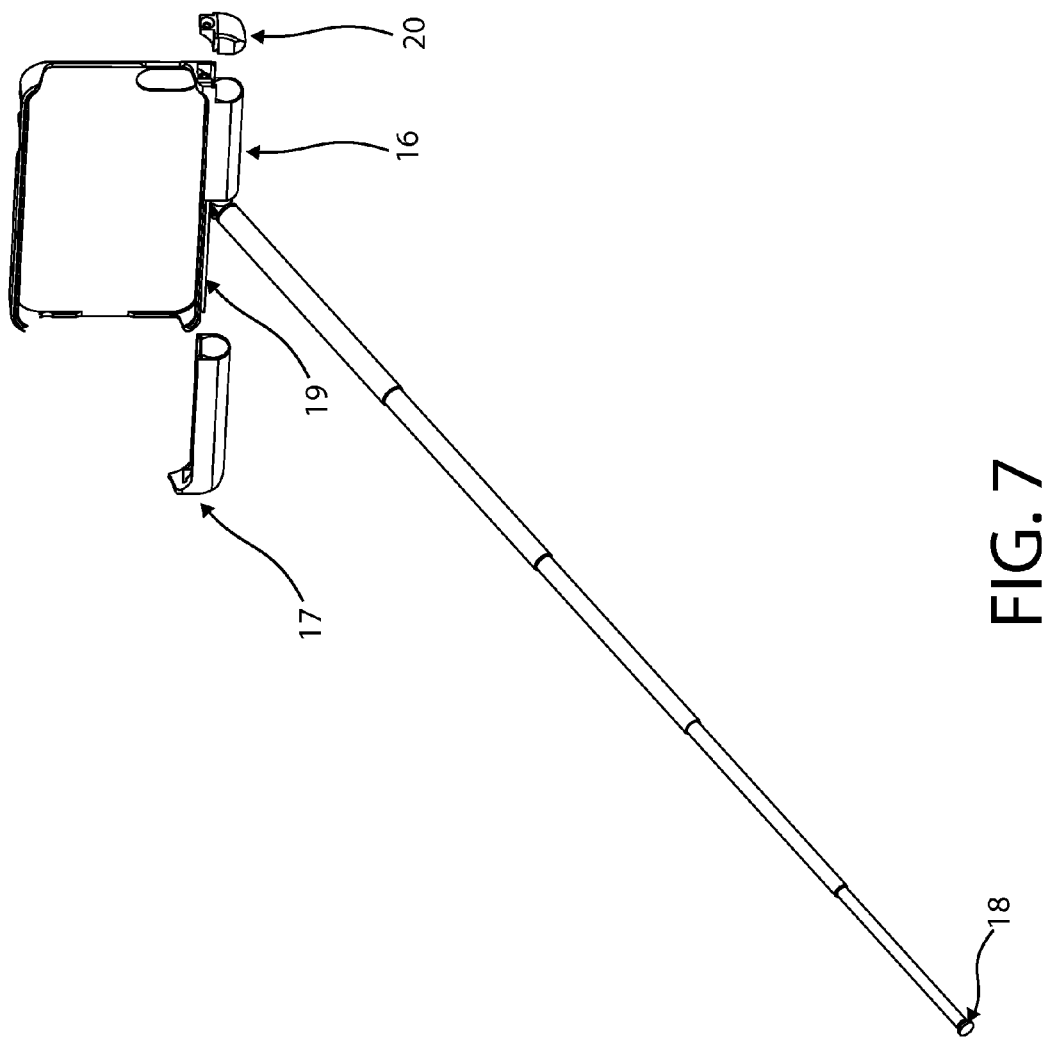
FIG. 7 is a partially assembled view of the single housing center balanced embodiment with an extended telescoping rod.
Figure 8:
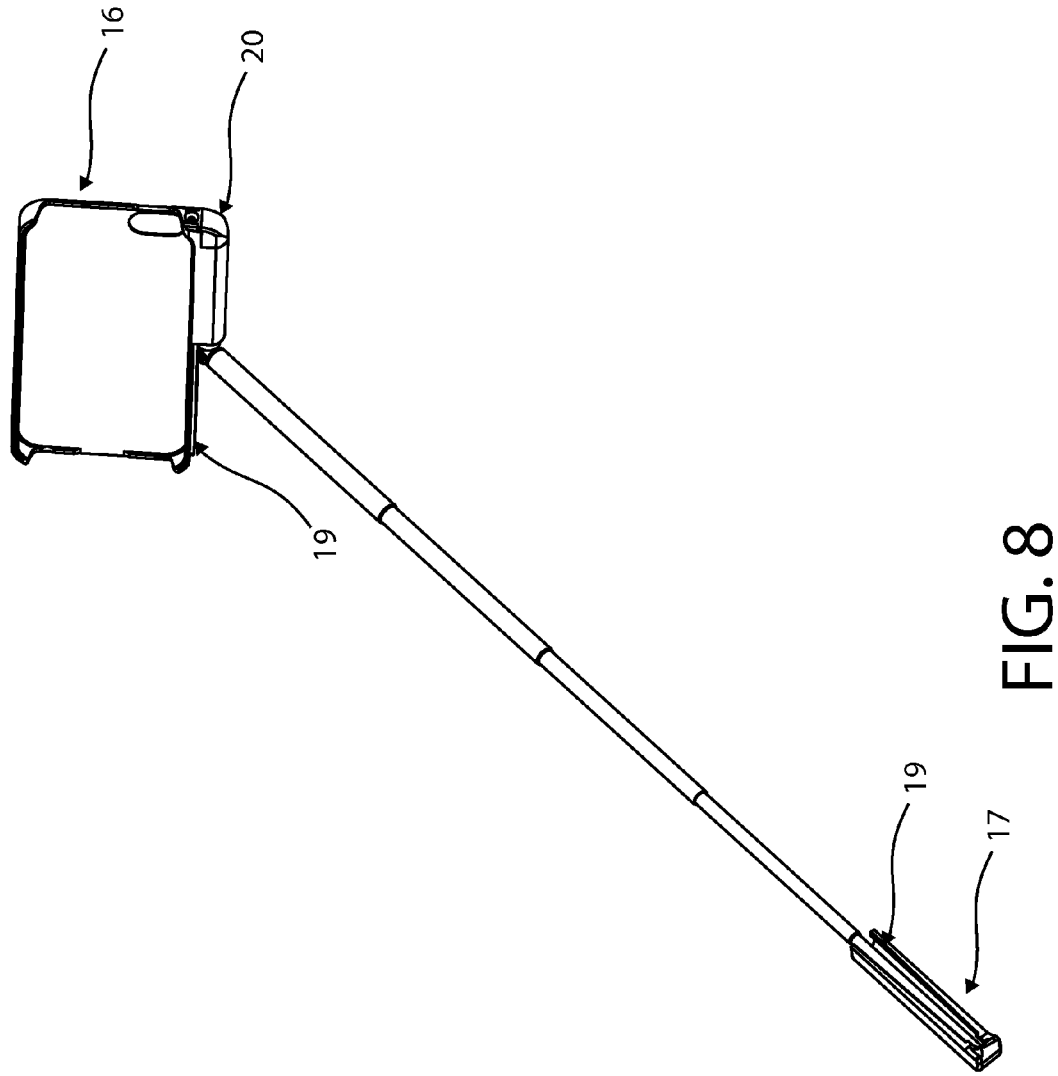
FIG. 8 is a fully assembled view of the single housing center balanced embodiment with an extended telescoping rod and connected handle

During connection of the lower housing 4 to the upper housing 3, the top of the telescoping rod assembly 14 aligns with and passes straight through the cylindrical channel bored in the lower housing 4. The fully stowed telescoping rod assembly 14, aligns the rod tip 13 flush to the outside of the lower housing 4 as shown in FIG. 1. When desired, the user may freely extend the telescoping rod assembly external to the lower housing 4 as shown in FIG. 2 by grasping the rod tip 6 via its groove and pulling the telescoping rod 5 out from the lower housing 4 until the connected geared base 6, intersects and locks with the lower housing gear receiving teeth 7 shown in FIG. 3 and FIG. 4. The lower housing receiving gear 7, prevents the telescoping rod assembly 14 from fully exiting the device/case assembly. Therefore, as the user continues to pull on the telescoping assembly 14, the force of the pull acts to extend the stowed telescoping rod assembly 14 shown in FIG. 3. The interconnection of the rod's geared teeth and the housing's receiving gear teeth 7 serve two purposes. First, it prevents the telescoping rod from unintentionally leaving the assembled device/case assembly, and secondly, it acts as a means to secure the device housing assembly at a desired specific angle depending on the rotational orientation of the rod gear's teeth 6 as it enters the housing gear's receiving teeth 7. This allows the user to lock the desired angle of the device's camera with respect to the object of the picture or video. The housing latch 12 prevents the lower housing from accidentally disconnecting due to gravity, external forces, or forces incurred as the user pulls the rod's base 6 against the lower housing as needed to extend the telescoping rod 5. Once the gear teeth are interlocked, then the user bends the extended telescoping rod 15 at the pivot joint 8 in order to orient the device to the desired angle and this angle is secured by the interlocked gear teeth. The act of bending the extended telescoping rod 15 at the pivot joint 8 additionally prevents the accidental reentry of the rod assembly into the case housing while in use. Additional drop prevention safety may be added to invention by securing a lanyard to the rod tip such that the user can connect the opposite end of secured lanyard to their wrist and thereby tether the entire assembly to their person via the lanyard. FIGS. 5, 6, 7, and 8 display a second variation of the invention. This variation shows a single body design 16 that allows the telescoping rod assembly 14 to exit the case at the devices horizontal center of mass. This center exit innovation alleviates potential torque induced by the weight of the electronic device from creating an axial rotational load on the extended telescoping rod thereby making the extended case and device more comfortable for the user to hold. FIG. 7 shows the fully extended telescoping rod with tip v2 18 connected to the single body design 16. Additionally, the telescoping rod handle 17 connects to the rod tip v2 18 to function as an optional handle when the device is extended FIG. 8. When the telescoping rod is stored in the body's housing FIG. 5, the telescoping rod handle securely connects to the single body design 16 using the complimentary alignment channels on both 19 FIGS. 6 and 8. Lastly, as shown in FIG. 6, the rod cap 20 serves as the cover for the entry point for the telescoping rod with rod tip v2. Telescoping rod with rod tip v2 functions the same as the telescoping rod complete with the lower housing gear receiver 7 as shown in FIG. 6.

Having described my invention, I claim:
1. A protective handheld case, the case comprising:
a male-geared base connected to the end of the telescoping rod which is fully concealed inside the case but is not permanently anchored to the case but the male geared base moves freely with the telescoping rod inside the case until it connects with one of two sets of female sockets on the case thereby locking and securing the telescoping rod to the case and also restricting angular rotation of the telescoping rod relative to the case whether stored or extended.
2. A case according to claim 1 wherein the male-geared rod base locks with the case at the case's center of gravity.

* * * * *